Patented Dec. 11, 1951

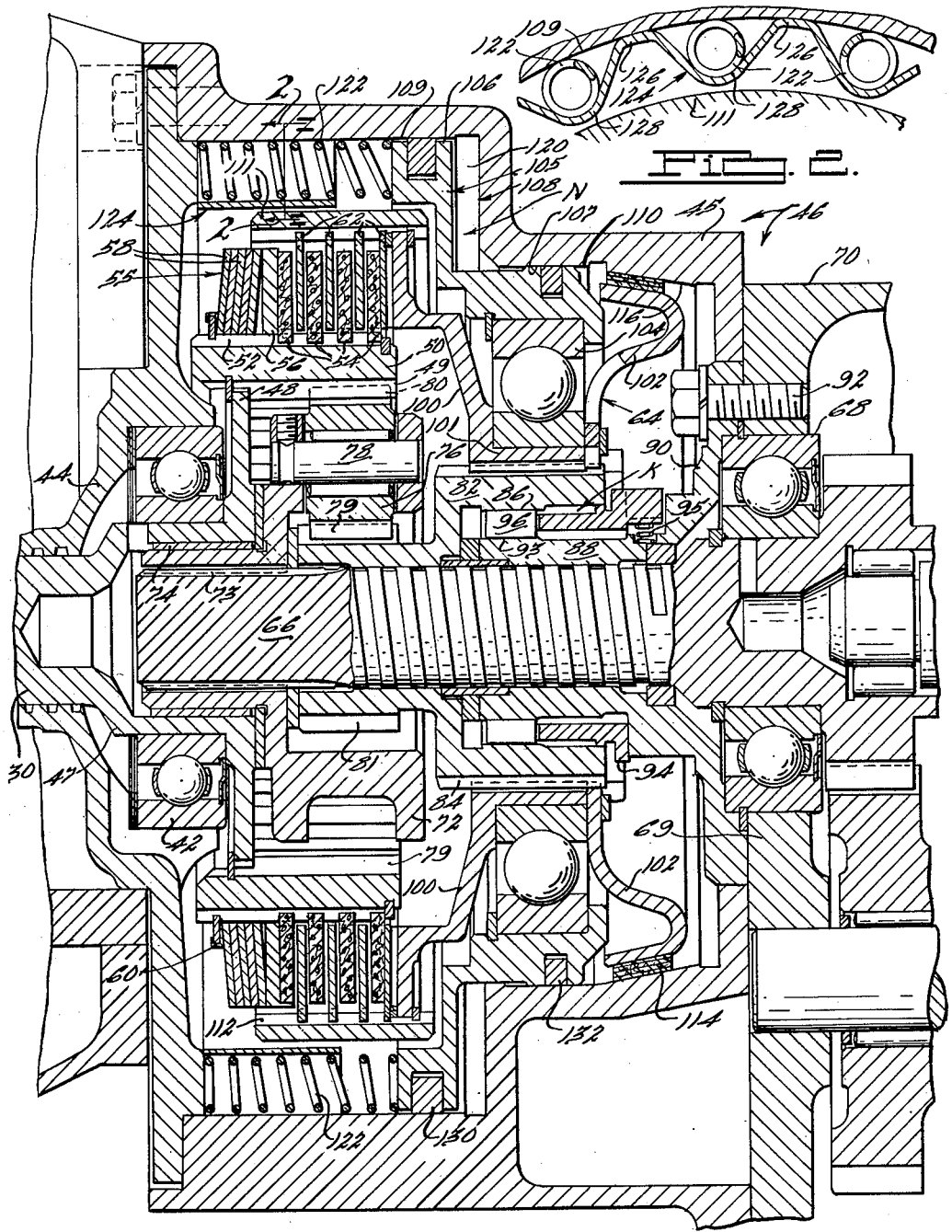

2,578,308

UNITED STATES PATENT OFFICE 2,578,308

PLANETARY TRANSMISSION

Teno Iavelli, Detroit, Mich., assignor to Chrysler Corporation, Highland Park, Mich., a corporation of Delaware Application June 24, 1949, Serial No. 101,071

15 Claims. (Cl. 74—781)

This invention relates to power transmissions of the planetary type and more particularly concerns improvements in the arrangement and construction of the control and other structure of planetary change speed mechanisms.

In United States Letters Patent No. 2,348,763 granted May 16, 1944 to A. J. Syrovy et al., there is disclosed a planetary underdrive change speed mechanism having a control member axially movable on an extension of the sun gear and shiftable axially in one direction by the piston of a differential pressure fluid motor into frictional engagement with the annulus member of the planetary to drivingly clutch the sun gear and annulus member to establish a 1:1 drive, and shiftable in the opposite direction by spring means to release this drive and frictionally engage a stationary housing element whereby to assist a reverse type overrunning roller brake in holding the sun gear from rotation to establish underdrive operation of the planetary mechanism.

Although satisfactory operation is afforded by this arrangement, it will be noted that the construction required an annular piston with internal and external working surfaces; an overrunning roller brake with internal cams and which was operable to hold the sun gear from rotation at a location a considerable distance from the mesh point of the sun and planet gears of the planetary mechanism. Moreover, assembly required the positioning of parts from both ends of the planetary casing.

The present invention aims to provide a more compact construction easily assembled from one end of the casing and provides, among additional features, a shorter casing; a stepped piston with only external working surfaces, operable in an open-ended-cylinder; a roller brake having external cams and operable close to the point of engagement of the sun gear and planet gears; and a clutch release spring assembly utilizing a retainer of substantially undulated circumferential section.

Other objects and advantages of my invention will become apparent from the following description and the drawings showing one exemplification of my invention.

In the drawings:

Figure 1 is a cross sectional elevation of the transmission of my invention; and Figure 2 is a partially circumferential section taken at 2—2 of Figure 1.

Referring now to the drawing wherein similar reference characters are used to designate corresponding parts of the structure, 30 is the input drive member of the planetary mechanism. It is rotatably supported by a ball bearing 42 carried by a plate 44 suitably secured to the forward portion 45, of a casing or housing generally designated by the numeral 46, and is formed forwardly of the bearing 42 with a bell-shaped end portion 47. The portion 47 carries a rigidly extending flange 48 having a toothed periphery adapted to mesh with internal teeth 49 of an annulus gear 50. The gear 50 has external teeth or splines 52 adapted to receive a plurality of rigid friction clutch plates 54 of a disc clutch generally designated by the numeral 55 and has a rigid bearing plate 56 mounted on the forward portion of the annulus member adjacent the plates 54. Dished resilient plates 58 are mounted about the annulus gear 50 adjacent the bearing plate 56 and are held endwise in position by a snap ring 60. The friction plates 54 are adapted to be engaged with other friction clutch plates 62 when a planetary control or throwout member generally designated by the numeral 64 is shifted forwardly to force the bearing plate 56 into engagement with the spring plates 58 by a differential pressure fluid operated motor generally designated by the letter N. A shaft 66, which is the output shaft of the planetary, has its forward end rotatably supported within the bell-shaped rearward end 46 of the shaft 30. The rearward end of the shaft 66 is rotatably supported by a bearing 68 carried by the transverse portion 69 of the rearward portion 70 of the transmission casing.

A planetary carrier or spider member 72 is splined to the forward portion of the shaft 66 at 73 and a bushing 74 rotatably separates the carrier from the shaft portion 46. Carrier 72 mounts a plurality of planet pinions 76 carried by axles 78. The teeth 79 of the planetary pinions mesh with internal teeth 80 of the annulus gear 50 and also mesh with the teeth of a sun gear 81, which is rotatably journalled on the shaft 66.

The sun gear 81 has a rearwardly extending cup-shaped portion 82 provided with external splines or teeth 84, a smooth internal annular surface 86 providing the outer race of a one-way overrunning brake mechanism, generally designated by the letter K, and which is located drivingly intermediate the sun gear extension 82 and the axially extending portion 88 of the housing plate member 90 secured by bolts 92 to the wall 69 of the housing portion 70 of the transmission. The extension 88 constitutes the inner race of the brake K and is provided with circumferentially spaced cam surfaces 93. A control cage 94 is normally biased by springs 95 to move the rollers 96 into driving engagement between the cam surfaces 93 and the surface 86. It is to be observed that the illustrated construction permits the roller brake to be positioned in the extreme forward portion of the recessed part of the sun gear extension and hence close to the point of engagement of the sun gear and planet pinions. This avoids high torsional stressing. In operation, brake K permits the sun gear 81 to overrun the housing plate flange 90 in a clockwise direction of rotation (looking rearwardly) but prevents overrunning between these parts in a counterclockwise rotational direction. Stated otherwise, the brake K holds the sun gear from reverse rotation.

The planetary control means 64 comprises a forwardly extending clutch operating spider member 100 having a hub 101 splined on the teeth 84 of the sun gear extension, a rearwardly extending brake operating member 102, a ball bearing 104 mounted on the hub 101 of the spider 100, and a stepped piston generally designated by the numeral 105 having the concentric annular working surfaces 106, 107 surrounding the bearing 104 and slidably engaging and reciprocable in a stepped cylinder generally designated by the numeral 108, formed by the casing portion 45 and which is complementary in shape to the piston and has the working surfaces 109, 110 respectively engageable with the surfaces 106, 107 of the piston.

The clutch spider 100 is substantially bell-shaped and mounts an annulus member 111 having internal splines 112 adapted to receive the rigid clutch plates 62 for rotation therewith.

As previously indicated, the clutch plates 62 are adapted to be engaged with the plates 54 when the control member 64 is moved forwardly by the piston 105 of the fluid motor N. Substantially simultaneously with such engagement the bearing plate 56 is forced against the dished spring plates 58 and by reason of the gradual pressure resistance provided by the plates 58 a smooth quiet engagement of the clutch plates 54, 62 is possible.

The brake operating member 102 has a frusto-conically-shaped outer peripheral surface to support a friction brake element 114, which is mounted thereon. This brake element is adapted to engage a frusto-conically-shaped complementary inner peripheral surface 116 of the casing portion 45 when the planetary control means 64 is shifted rearwardly for holding the sun gear from rotation in either direction. The chief function of this brake 114 is to prevent overrunning of the sun gear 81 during coast operation of the vehicle. Since the coast load is much less than the driving torque in underdrive, the friction brake 114 is adequate for this purpose. When the vehicle is being driven in underdrive, the brake K acts to hold the sun gear from reverse rotation and the friction brake 114 assists. Under either condition of operation the sun gear is held from rotation. Thus when the engine is driving, the shaft 66 is driven by the shaft 30 through the planetary gearing at a reduced speed ratio. On the other hand, during vehicle coast the shaft 66 becomes the driver and will drive the drive shaft 30 through the planetary gearing at an overspeed relative to the shaft 66. Moreover, in either case a two-way gearing drive is provided.

The motor N may be suitably operated by differential fluid pressure provided by oil pressure or vacuum. Preferably the motor is actuated as disclosed in the Syrovy Patent No. 2,348,763 by oil pressure through a pump P under control of a vehicle speed responsive governor G and the solenoid operated valve mechanism S'V' all illustrated in Figure 26 of said patent and which are made a part hereof. At predetermined vehicle speed fluid under pressure is admitted to the cylinder 108 through a passage 120 and acts upon the piston 105 to move the control means 64 forwardly to engage the disc clutch mechanism 55 for establishing direct drive in the planetary. When the motor N is vented below said speed or by accelerator kickdown operation springs 122 serve to release the clutch 55 and engage the brake 114 to establish underdrive. It will be observed that the springs 122 are held in position adjacent the wall 109 of the cylinder 108 of the casing portion 45 by an annular member generally designated by the numeral 124 having an undulated circumferential section which, as seen in Figure 2, comprises alternate raised portions 126 embracing the wall 109 and alternate depressed portions 128 in part embracing the springs 122 to thus retain them circumferentially spaced while guiding them in their operation. It will be understood that not all raised portions need engage the wall 109, at least three spaced 120 degrees apart being preferred. Moreover, sufficient clearance will be provided to permit compression of the springs 122. The coil spring retainer may be made of sheet metal. It may be a continuous ring of the stated section or may be a split outwardly acting spring ring. The shape of the undulated shape will manifestly be determined by the diameter of the springs 122 and the spacing thereof circumferentially of the casing 45.

The annular-shaped stepped piston 105 of the motor N is reciprocable in the stepped cylinder 108 of the casing portion 45. It will be observed that the piston 105 requires only external operating surfaces 106, 107 which, as seen, are provided with sealing rings 130 and 132. Suitable means, not shown, may be provided between the piston and the casing portion 69 to prevent rotation thereof relative to the casing. The stepped construction of the piston 105 and the manner of retaining the springs 122 in place make is possible to dispose the springs 122 adjacent the largest periphery of the piston and the housing plate 44. The arrangement moreover, permits the use of a greater number of springs of lighter force value and having a greater number of turns. It will also be observed that the bearing 104 permits rotation of the control member 64 relative to the piston 105 at all times when the brake 114 is disengaged. Moreover the described construction facilitates assembly of all parts from the left end of the casing portion 45 and permits many portions of the planetary mechanism and control member to be preassembled as units to be subsequently assembled in position on the shaft 66, in the casing 45, all from the said one end.

From the above description of my invention it will be seen that I have provided a novel construction of planetary mechanism and control therefor which is simple, readily assembled, requires a minimum of space and is effective to carry out the functions for which it is intended. Although the specific embodiment illustrated and described is well adapted for carrying out the various objects of my invention, it will be understood that various modifications, changes and substitutions may be made by those skilled in the art without departing from the spirit thereof. The invention is, therefore, to be con-

What is claimed is:

1. In a power transmission the combination comprising a cylinder, a piston reciprocable in said cylinder, means for conducting differential pressure fluid to one side of said piston, a plurality of coil compression springs operable on the opposite side of said piston and positioned in spaced relationship adjacent the wall of said cylinder and an annular undulated spring retainer means axially spaced from said piston having wall portions embracing said springs and other wall portions embracing said cylinder wall.

2. In a power transmission including a casing, an input shaft and an output shaft; change speed gearing for selectively driving the output shaft from the input shaft in a plurality of speed ratio drives; means including a shiftable element for controlling said change speed gearing, and motor means for operating said control means including a piston movable with the shiftable element, said piston having offset coaxial annular working surfaces, a cylindric wall in said casing having offset coaxial annular working surfaces complementary to those of said piston and providing with said piston a differential pressure fluid receiving chamber, a plurality of coil compression springs positioned in spaced relation adjacent said cylindric wall and a retainer of corrugated shape having alternate portions embracing a spring and other alternate portions embracing said wall.

3. In a power transmission mechanism the combination comprising a reciprocating piston, power means for actuating said piston in one direction of movement, a plurality of coil compression springs circularly arranged with respect to the piston for actuating said piston in the opposite direction of movement, a casing having a wall confining said springs on one side thereof, an annular resilient retainer confining said springs on the other side thereof, said retainer having alternate portions embracing said springs and alternate portions embracing said wall.

4. In a power transmission including a casing, an input shaft, and an output shaft; a planetary change speed mechanism drivingly connected between said shafts operable for selectively driving the output shaft from the input shaft in a plurality of speed ratio drives, said planetary mechanism including a sun gear member having an axial extension, a control member mounted on said extension, said control member being non-rotatable relative to said extension and being axially movable relative thereto for effecting speed ratio changes in said transmission, an antifriction bearing carried by said control member and movable therewith said bearing being concentric with said extension, an operating element for actuating said control member, said element surrounding said bearing and movable with said control member, and a releasable one-way roller brake drivingly intermediate said sun gear extension and said casing and concentric with said bearing, said brake comprising an outer race on said sun gear extension, and an inner race provided with an external roller cam surface and carried by said casing rearwardly of said cam surface.

5. In a power transmission including a casing, an input shaft, and and output shaft; planetary gear means including an annulus member, a planet carrier member, and a sun gear, one of said annulus and carrier members being drivingly connected to said input shaft, and having a portion externally of said planetary gearing provided with clutch means, the other member being rotatable with the output shaft, and the sun gear being journalled on said output shaft and having a rearward axial extension providing the outer race of a one-way roller brake; a forward annular extension of said casing in telescoping relation with said sun gear extension providing the inner cam race of said brake; clutch means forwardly of said extension carried by said sun extension so as to be non-rotatable relative thereto and axially shiftable thereon into engagement with the said clutch means of said one member for clutching said one member and sun gear together for unitary drive, friction brake means rearwardly of said extension connected with said extension so as to be non-rotatable relative thereto and spaced from said shiftable clutch means, friction braking means on said casing, said friction brake means being shiftable into engagement with said braking means on said casing and in a direction opposite to which said clutch means is shifted for engagement, for holding said sun gear from rotation; an antifriction bearing having an outer race and having an inner race mounted intermediate said clutch and brake means of said sun gear extension; a cylinder provided by said casing, a piston connected with said outer bearing race and operable in said cylinder for shifting said clutch and friction brake means; and springs means forwardly of said piston and arranged around said clutch means, operable to shift said clutch and friction brake means through said piston.

6. In a power transmission including a casing, an input shaft, and an output shaft; a planetary change speed mechanism drivingly connected between said shafts operable for selectively driving the output shaft from the input shaft in a plurality of speed ratio drives, said planetary mechanism including a sun gear member having an axial extension, a control member mounted on said extension, said control member being non-rotatable relative to said extension and being axially movable relative thereto for effecting speed ratio changes in said transmission, and antifriction bearing carried by said control member and movable therewith, a piston reciprocable in said casing for actuating said control member, said piston surrounding said bearing and movable with said control member, a plurality of coil compression springs positioned in spaced relation in said casing adjacent the periphery of said piston, an annular retainer having alternate portions embracing said springs and alternate portions embracing said casing, and a releasable one-way roller brake drivingly intermediate said sun gear extension and casing and concentric with said bearing, said brake comprising an outer raceway on said sun gear extension and an inner raceway carried by said casing.

7. In a power transmission including a casing, an input shaft, and an output shaft; a planetary change speed mechanism drivingly connected between said shafts operable for selectively driving the output shaft from the input shaft in a plurality of speed ratio drives, said planetary mechanism including a sun gear member having an axial extension, a control member mounted on said extension, said control member being non-rotatable relative to said extension and being axially movable relative thereto for effecting speed ratio changes in said transmission, an antifriction bearing carried by said control member and movable therewith, a pair of offset annular working surfaces of different diameter in said casing, a piston reciprocable in said casing for actuating said control member, said piston having a pair of offset annular working surfaces of different diameter complementary to and in engagement with said annular surfaces of said casing, and said piston surrounding said bearing and being movable with said bearing and control member, a plurality of coil compression springs positioned in spaced relation in said casing adjacent the largest periphery of said piston, an annular retainer having alternate portions embracing said springs and alternate portions embracing said casing, and a releasable one-way roller brake drivingly intermediate said sun gear extension and said casing and concentric with said bearing, said brake comprising an outer race on said sun gear extension and an inner raceway carried by said casing.

8. In a power transmission including a casing, an input shaft, and an output shaft; a planetary change speed mechanism drivingly connected between said shafts operable for selectively driving the output shaft from the input shaft in a plurality of speed ratio drives, said planetary mechanism including a sun gear member having an axial extension, a control member mounted on said extension, said control member being non-rotatable relative to said extension and being axially movable relative thereto for effecting speed ratio changes in said transmission, an antifriction bearing carried by said control member and movable therewith, axially stepped annular working surfaces in said casing, a piston reciprocable in said casing for actuating said control member, said piston having axially stepped annular working surfaces complementary to and in engagement with said working surfaces of said casing and said piston surrounding said bearing and being movable with said bearing and control member, and a releasable one-way roller brake drivingly intermediate said sun gear extension and said casing and concentric with said bearing, said brake comprising an outer raceway on said sun gear extension and an inner cammed raceway carried by said casing.

9. In a power transmission including a casing, an input shaft, and an output shaft, planetary gear means including an annulus member, a planet carrier member, and a sun gear, one of said annulus and carrier members being drivingly connected to said input shaft, and having a portion externally of said planetary gearing provided with clutch means, the other member being rotatable with the output shaft, and the sun gear being journalled on said output shaft and having an axial extension; clutch means carried by said sun extension so as to be non-rotatable relative thereto and axially shiftable thereon into engagement with the said clutch means of said one member for clutching said one member and sun gear together for unitary drive, brake means connected with said extension so as to be non-rotatable relative thereto and spaced from said shiftable clutch means, braking means on said casing, said brake means being shiftable into engagement with said braking means on said casing and in a direction opposite to which said clutch means is shifted for engagement, for holding said sun gear from rotation; an antifriction bearing having an outer race, and having an inner race mounted intermediate said clutch and brake means of said sun gear extension; a cylinder provided by said casing, a piston connected with said outer race and operable in said cylinder for shifting said clutch and brake means; and spring means surrounding said clutch means operable to shift said clutch and brake means through said piston.

10. In a power transmission including a casing, an input shaft, and an output shaft; planetary gear means including an annulus member, a planet carrier member, and a sun gear, one of said annulus and carrier members being drivingly connected to said input shaft, and having a portion externally of said planetary gearing provided with clutch means, the other member being rotatable with the output shaft, and the sun gear being journalled on said output shaft and having an axial extension providing the outer race of a one-way roller brake; an annular extension of said casing in telescoping relation with said sun gear extension providing the inner race of said brake; clutch means carried by said sun extension so as to be non-rotatable relative thereto and axially shiftable thereon into engagement with the said clutch means of said one member for clutching said one member and sun gear together for unitary drive, friction brake means connected with said extension so as to be non-rotatable relative thereto and spaced from said shiftable clutch means, friction braking means on said casing, said friction brake means being shiftable into engagement with said braking means on said casing and in a direction opposite to which said clutch means is shifted for engagement, for holding said sun gear from rotation; an antifriction bearing having an outer race, and having an inner race mounted intermediate said clutch and brake means of said sun gear extension; a cylinder provided by said casing, a piston connected with said outer race and operable in said cylinder for shifting said clutch and friction brake means; a plurality of coil compression springs positioned in spaced relation adjacent the periphery of said piston and cylinder, and an annular retainer having alternate portions embracing said springs and alternate portions embracing said cylinder.

11. In a power transmission including a casing, an input shaft, and an output shaft; planetary gear means including an annulus member, a planet carrier member, and a sun gear, one of said annulus and carrier members being drivingly connected to said input shaft, and having a portion externally of said planetary gearing provided with clutch means, the other member being rotatable with the output shaft, and the sun gear being journalled on said output shaft and having a rearward axial extension providing the outer race of a one-way roller brake; a forward annular extension of said casing in telescoping relation with said sun gear extension providing the inner cam race of said brake; clutch means forwardly of said extension carried by said sun extension so as to be non-rotatable relative thereto and axially shiftable thereon into engagement with the said clutch means of said one member for clutching said one member and sun gear together for unitary drive, friction brake means rearwardly of said extension connected with said extension so as to be non-rotatable relative thereto and spaced from said shiftable clutch means, friction braking means on said casing, said friction brake means being shiftable into engagement with said braking means on said casing and in a direction opposite to which said clutch means is shifted for engagement, for holding said sun gear from rotation; an antifriction bearing having an outer race, and having an inner face mounted intermediate said clutch and brake means of said sun gear extension; a cylinder provided by said casing, a piston connected with said outer race and operable in said cylinder for shifting said clutch and friction brake means; said piston and cylinder having stepped annular working surfaces; and a plurality of coil springs forwardly of said piston and arranged around said clutch means operable to shift said clutch and brake means through said piston.

12. In a power transmission including a casing, an input shaft, and an output shaft; planetary gear means including an annulus member, a planet carrier member, and a sun gear, one of said annulus and carrier members being drivingly connected to said input shaft, and having a portion externally of said planetary gearing provided with clutch means, the other member being rotatable with the output shaft, and the sun gear being journalled on said output shaft and having an axial extension providing the outer race of a one-way roller brake; an annular extension of said casing in telescoping relation with said sun gear extension providing the inner race of said brake; clutch means carried by said sun extension so as to be non-rotatable relative thereto and axially shiftable thereon into engagement with the said clutch means of said one member for clutching said one member and sun gear together for unitary drive, brake means connected with said extension so as to be non-rotatable relative thereto and spaced from said shiftable clutch means, braking means on said casing, said brake means being shiftable into engagement with said braking means on said casing and in a direction opposite to which said clutch means is shifted for engagement, for holding said sun gear from rotation; an anti-friction bearing having an outer race, and having an inner race mounted intermediate said clutch and brake means of said sun gear extension; a cylinder provided by said casing, a piston connected with said outer race and operable in said cylinder for shifting said clutch and brake means, said piston and cylinder having stepped annular working surfaces; a plurality of coil compression springs positioned in spaced relation adjacent the periphery of said piston and cylinder and an annular retainer having alternate portions embracing said springs and alternate portions embracing said cylinder.

13. In a transmission, an input shaft, an output shaft, casing means having an outer longitudinal wall and a transverse wall, a planetary gear unit including an annulus gear rotatable with the input shaft, a planet carrier rotatable with said output shaft, and a sun gear journalled on the output shaft for rotation relative thereto, said sun gear having an axial extension provided with an annular wall, the inner surface of which is smooth, a bracket carried by said casing means, said bracket having an axial extension provided with external cam surfaces arranged coaxial with the sun gear extension and extending within the annular wall of the sun gear extension, a plurality of rollers disposed between said surfaces of said extensions and operative to prevent reverse rotation of the sun gear, drive control means carried by said sun gear extension and axially movable as a unit, comprising a ball bearing, a clutching member on one side of said bearing, a braking element on the other side of said bearing, a stepped piston encircling said bearing, a stepped cylinder wall in a longitudinal portion of said casing means for receiving said piston, friction means operatively arranged between said clutching member and said annulus adapted when engaged to lock said annulus and sun gears together to establish a 1:1 ratio drive between said shafts, stationary friction means operatively arranged between said braking member and said casing means adapted when engaged to hold said sun gear stationary relative to said casing means whereby to establish a torque multiplying drive between said shafts through said gearset, means connecting said cylinder to a source of differential fluid pressure for moving said piston in one axial direction to effect said clutch engagement, a plurality of circumferentially spaced compression springs arranged adjacent one of the cylinder walls and an undulated ring having portions in contact with said wall and other portions embracing said springs.

14. In a power transmission including a casing, an input shaft, and an output shaft; change speed gearing for selectively driving the output shaft from the input shaft in a plurality of speed ratio drives; control means for said change speed gearing including a clutch element, a piston and a brake element all shiftable as a unit, said clutch and brake elements being adjacent opposite ends of said piston and said piston having stepped cylindrical working surfaces one of which is at the clutch end thereof and surrounds said clutch element; a cylindrical wall in said casing having stepped concentric working surfaces complementary to those of said piston and providing with said piston a chamber for receiving differential pressure fluid for actuating said piston; spring means for actuating said piston; and an annular space between said casing surface complementary to said one piston surface and the outermost periphery of said clutch element for receiving said spring means.

15. In a power transmission including a casing, an input shaft and an output shaft; a planetary change speed mechanism drivingly connected between said shafts and including a sun gear member having an axial extension, an annulus member, and a carrier member; a control unit for said planetary carried by said sun gear extension and including a clutch member operable for drivingly connecting said sun gear with one of the other of said members of said planetary mechanism, a brake member operable for holding said sun gear from rotation, an anti-friction bearing intermediate said clutch and brake members, and a piston carried by said bearing and having one end adjacent said clutch member and its opposite end adjacent said brake member; said piston having stepped cylindrical working surfaces one of which is at the clutch end thereof and surrounds said clutch element; a cylindrical wall in said casing having stepped concentric working surfaces complementary to those of said piston and providing with said piston a chamber for receiving differential pressure fluid for actuating said piston; spring means for actuating said piston; an annular space between said casing surface complementary to said one piston surface and the outer periphery of said clutch element for receiving said spring means; and a one-way roller brake operable between said sun gear member and said casing and comprising an outer race provided by said sun gear extension and including a smooth roller raceway internally of the latter and an inner race provided by an extension of said casing and including a cam-